(12) United States Patent
Sampson

(10) Patent No.: US 9,234,733 B2
(45) Date of Patent: Jan. 12, 2016

(54) SPEED TAPE

(71) Applicant: Marcus Paul Sampson, Lumberton, NC (US)

(72) Inventor: Marcus Paul Sampson, Lumberton, NC (US)

( * ) Notice: Subject to any disclaimer, the term of this patent is extended or adjusted under 35 U.S.C. 154(b) by 135 days.

(21) Appl. No.: 14/174,040

(22) Filed: Feb. 6, 2014

(65) Prior Publication Data

US 2015/0219430 A1    Aug. 6, 2015

(51) Int. Cl.
*G01B 3/10* (2006.01)

(52) U.S. Cl.
CPC ............ *G01B 3/1084* (2013.01); *G01B 3/1071* (2013.01); *G01B 3/1082* (2013.01); *G01B 2003/1007* (2013.01); *G01B 2003/1074* (2013.01); *G01B 2003/1089* (2013.01); *G01B 2003/1092* (2013.01)

(58) Field of Classification Search
CPC ..................... G01B 3/1071; G01B 2003/1092; G01B 2003/1074; G01B 3/1082; G01B 3/1084; G01B 2003/1007
USPC ..................................... 33/761, 767, 769, 759
See application file for complete search history.

(56) References Cited

U.S. PATENT DOCUMENTS

| | | | | |
|---|---|---|---|---|
| 2,840,914 A | * | 7/1958 | Buckelew | 33/403 |
| 3,021,599 A | * | 2/1962 | Odom | 33/275 R |
| 4,702,012 A | * | 10/1987 | Miller | 33/464 |
| 5,077,910 A | * | 1/1992 | Smith | 33/760 |
| 5,782,077 A | * | 7/1998 | Porte | 60/782 |
| 6,173,505 B1 | * | 1/2001 | Munno | 33/761 |
| 7,020,978 B1 | * | 4/2006 | Nelson | 33/760 |
| 2006/0196072 A1 | * | 9/2006 | Lewis et al. | 33/760 |

* cited by examiner

*Primary Examiner* — Laura Martin
*Assistant Examiner* — Rhyan C Lange
(74) *Attorney, Agent, or Firm* — Kyle A. Fletcher, Esq.

(57) ABSTRACT

The framing layout assembly includes a housing that is positionable proximate the member. A tape is operationally coupled to the housing. The tape may be extendable from the housing. The tape has indicia printed thereon. The indicia indicates distance. The tape has a tape hole extending therethrough. A guide is operationally coupled to the housing. The tape extends through the guide. A stop is operationally coupled to the housing. The stop is extendable through the hole in the tape. The tape is retained at a pre-determined distance. A jig is operationally coupled to the housing. The jig is positionable on the member. A user marks the member at the pre-determined distance.

18 Claims, 5 Drawing Sheets

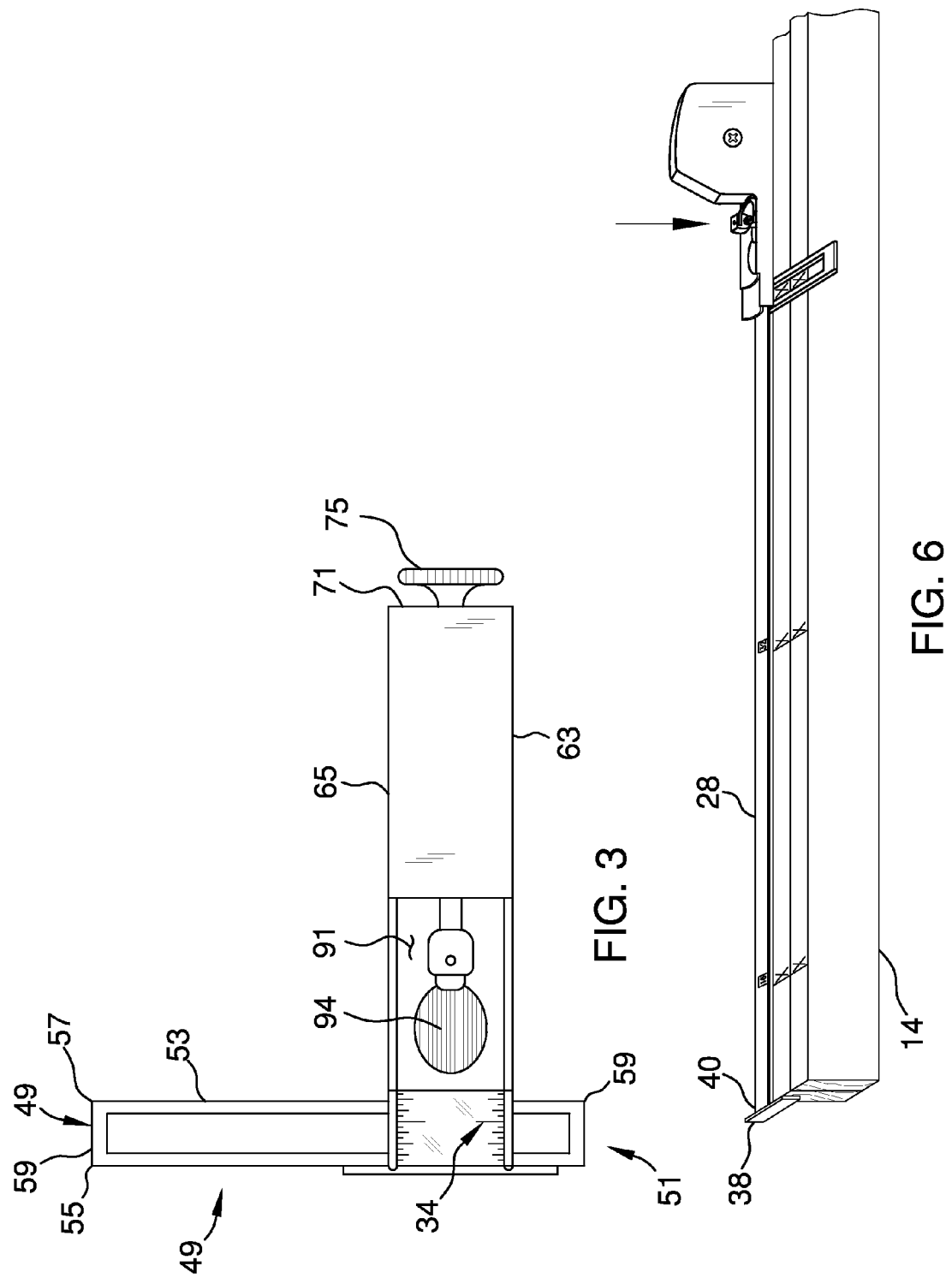

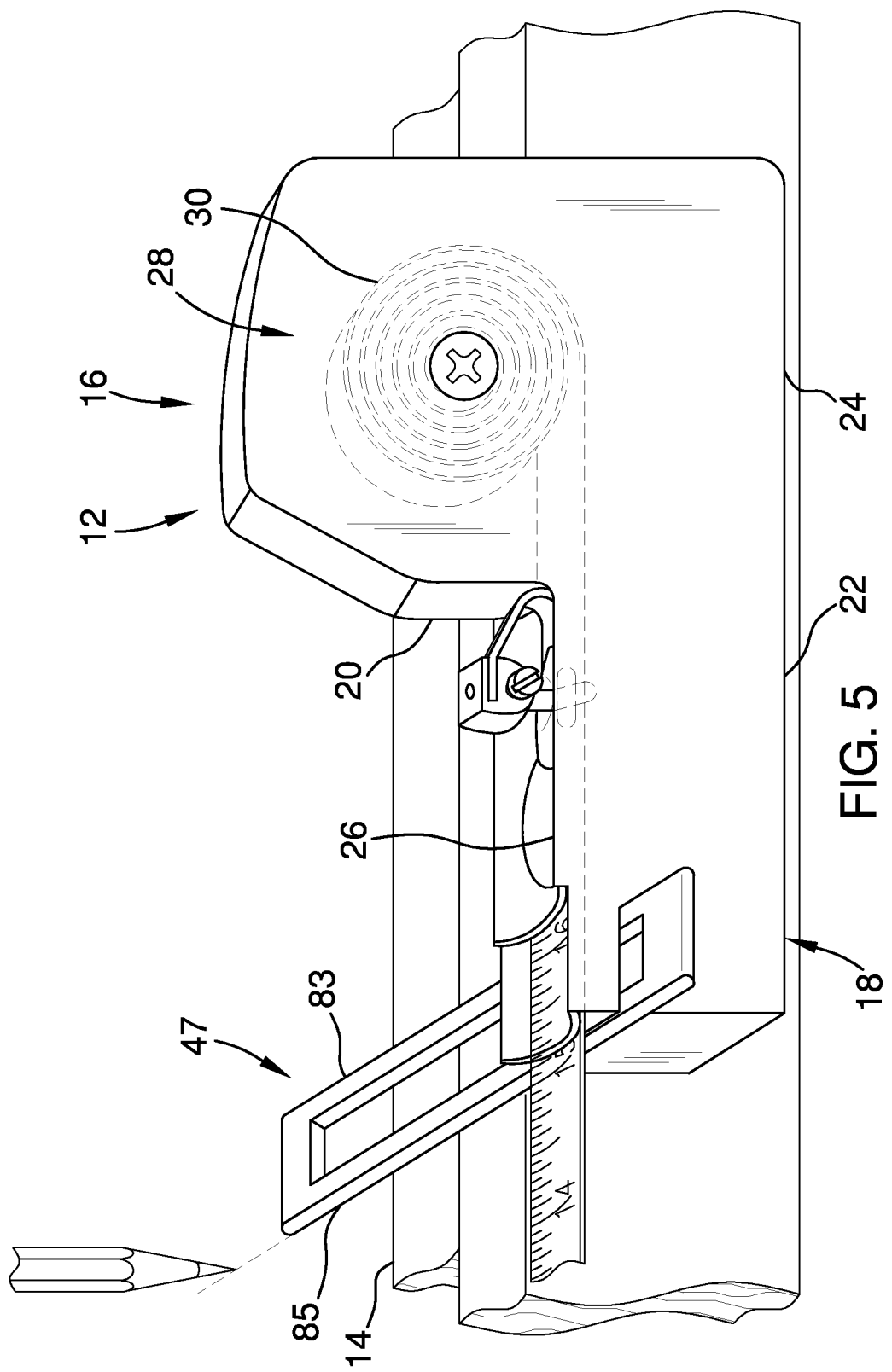

SPEED TAPE

CROSS REFERENCES TO RELATED APPLICATIONS

This non-provisional patent application claims priority to the provisional patent application 61/850,013, which was filed on Feb. 7, 2013.

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of measuring tapes, more specifically, a measuring tape that includes a jig that works in conjunction with the measuring tape.

SUMMARY OF THE INVENTION

An embodiment of the disclosure meets the needs presented above by generally comprising a housing that is positionable proximate the member. A tape is operationally coupled to the housing. The tape may be extendable from the housing. The tape has indicia printed thereon. The indicia indicates distance. The tape has a tape hole extending there through. A guide is operationally coupled to the housing. The tape extends through the guide. A stop is operationally coupled to the housing. The retained at a pre-determined distance. A jig is operationally coupled to the housing. The jig is positionable on the member. A user marks the member at the pre-determined distance.

These together with additional objects, features and advantages of the speed tape will be readily apparent to those of ordinary skill in the art upon reading the following detailed description of presently preferred, but nonetheless illustrative, embodiments of the speed tape when taken in conjunction with the accompanying drawings.

In this respect, before explaining the current embodiments of the speed tape in detail, it is to be understood that the speed tape is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the speed tape.

It is therefore important that the claims be regarded as including such equivalent construction insofar as they do not depart from the spirit and scope of the speed tape. It is also to be understood that the phraseology and terminology employed herein are for purposes of description and should not be regarded as limiting.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 3 is a top view of an embodiment of the disclosure.

FIG. 5 is an in-use view of an embodiment of the disclosure.

FIG. 6 is a perspective in-use view of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
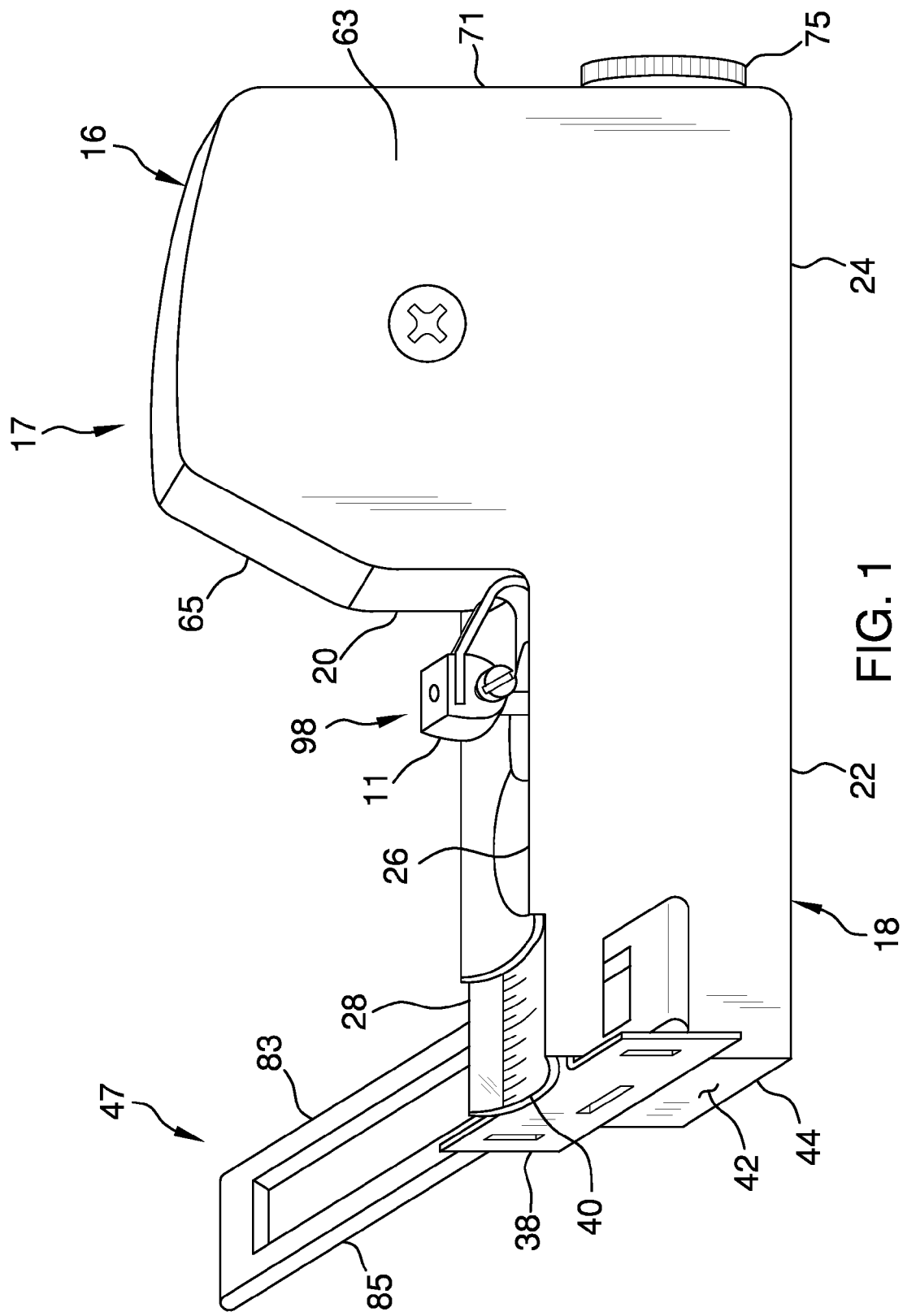
FIG. 1 is a perspective view of a framing layout assembly according to an embodiment of the disclosure.
Figure 2:
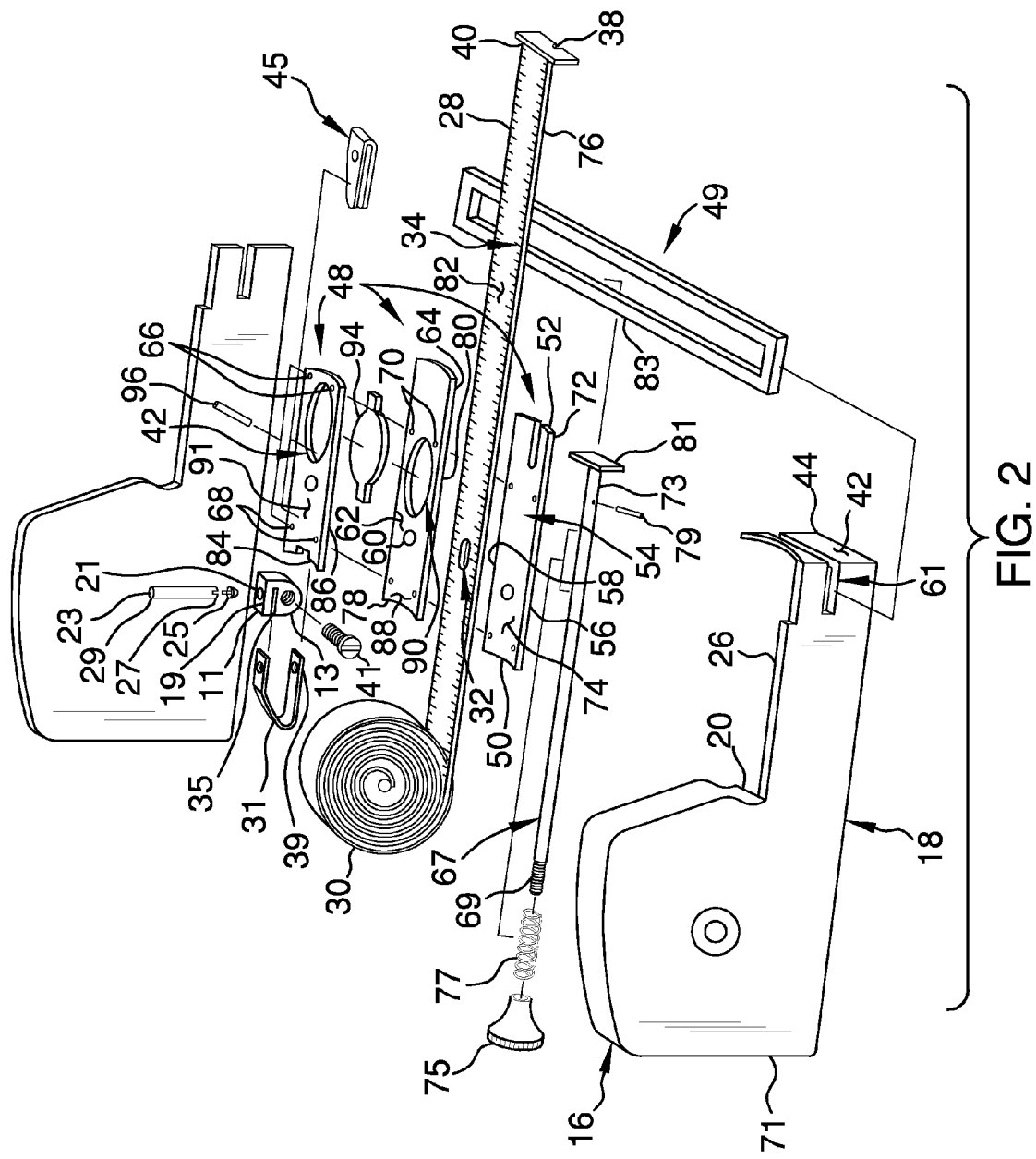
FIG. 2 is a right side exploded view of an embodiment of the disclosure.
Figure 4A:
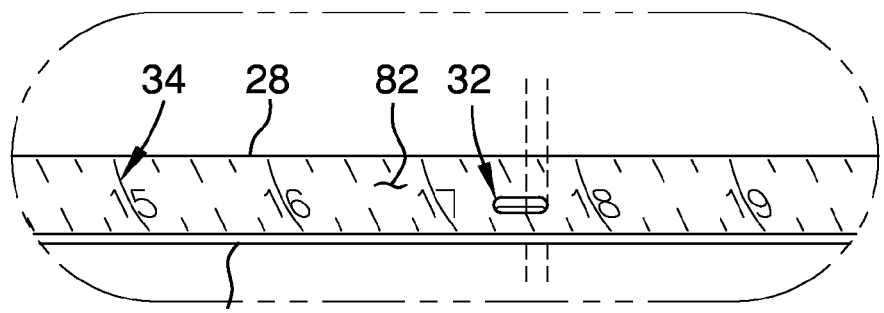
FIG. 4A is a cutaway view of an embodiment of the disclosure.
Figure 4B:
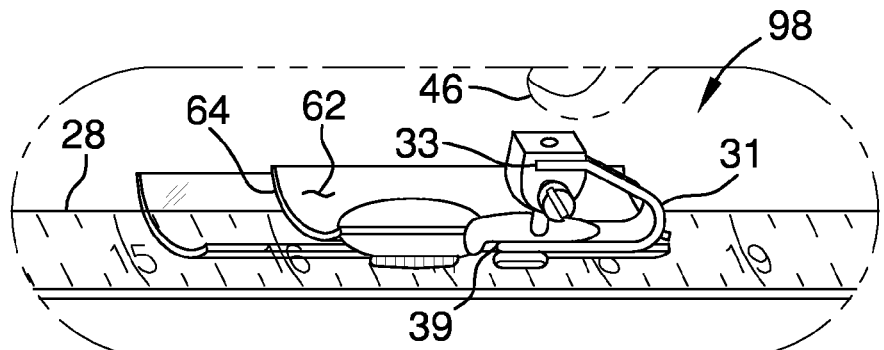
FIG. 4B is a cutaway view showing a stop of an embodiment of the disclosure.
Figure 4C:
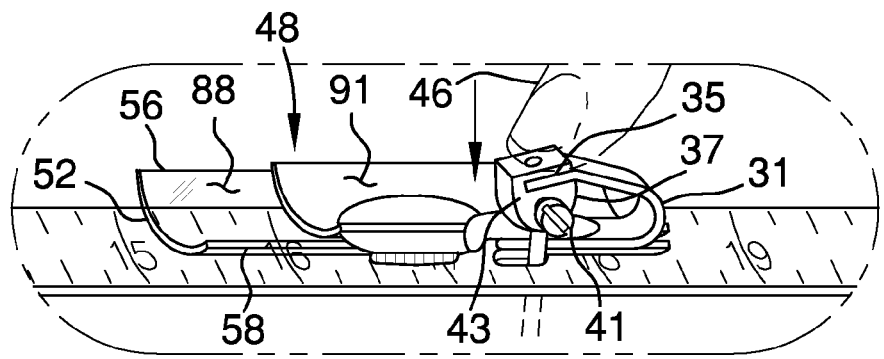
FIG. 4C is a cutaway view showing an actuated stop of an embodiment of the disclosure.
Figure 4D:
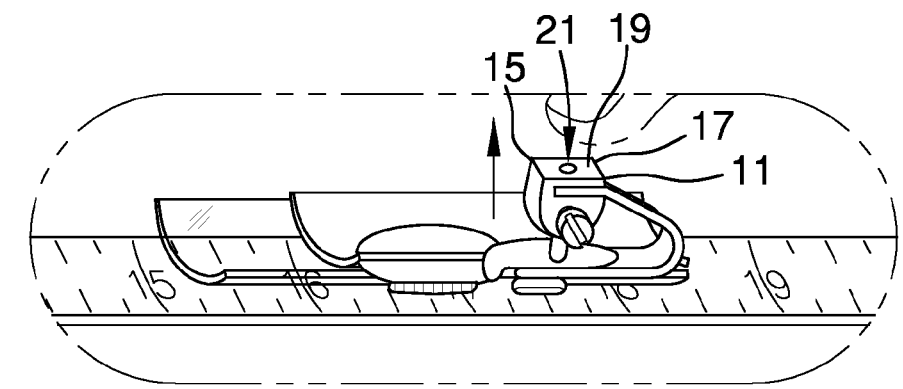
FIG. 4D is a cutaway view a de-actuated stop of an embodiment of the disclosure.

As best illustrated in FIGS. 1 through 6, the framing layout assembly 10 generally comprises a housing 12 that is positionable proximate a member 14. The member 14 may be a length of framing lumber of any conventional design. A rear portion 16 of the housing 12 has a height that is similar to a length of the rear portion 16 of the housing 12. Moreover, the rear portion 16 of the housing 12 has a square shape.

A front portion 18 of the housing 12 extends forwardly from a front side 20 of the rear portion 16 of the housing 12. Continuing, a bottom side 22 of the rear portion 16 of the housing 12 is planar with a lower side 24 of the front portion 18 of the housing 12. A top side 26 of the front portion 18 of the housing 12 is open. The front portion 18 of the housing 12 has a length is greater than a height of the front portion 18 of the housing 12. Additionally, the front portion 18 of the housing 12 has a rectangular parallelepiped shape. An interior of the front portion 18 of the housing 12 is in fluid communication with an interior of the rear portion 16 of the housing 12.

A tape 28 is provided. The tape 28 is elongated. Continuing, the tape 28 is rolled upon itself such that the tape 28 forms a spool 30. The spool of tape 30 is rotatably coupled to the housing 12 such that the spool of tape 30 is positioned within an interior of the rear portion 16 of the housing 12. Finally, the spool of tape 30 may be a tape measure of any conventional design.

The tape 28 has a tape hole 32 extending through a top surface 82 and a lower surface 76 of the tape. The tape hole 32 is one of a plurality of the tape holes 32 that is evenly spaced apart and distributed along an entire length of the tape 28. Continuing, the plurality of tape holes 32 are each spaced 16 inches apart. Indicia 34 is printed on the top surface 82 of the tape 28. The indicia 34 indicates distance. Lastly, the indicia 34 may indicate increments of distance ranging between ⅟₃₂ of an inch and ⅟₁₆ of an inch.

A retainer 38 is coupled to a free end 40 of the tape 28. The tape 28 extends forwardly through the front portion 18 of the housing 12. Moreover, the retainer 38 abuts an outer surface 42 of a front side 44 of the front portion 18 of the housing 12. The retainer 38 on the tape 28 is extendable forwardly from the front side 44 of the front portion 18 of the housing 12. Additionally, the tape 28 extends outwardly from the front portion 18 of the housing 12 so the indicia 34 on the tape 28 is visible to a user 46. Finally, the tape 28 may have a total length between 16 feet and 20 feet.

A guide 48 is provided. The guide 48 is elongated between a back end 50 and a front end 52 of the guide 48. Additionally, the guide 48 curves upwardly from a middle 54 of the guide 48 toward each of a first lateral edge 56 and a second lateral edge 58 of the guide 48. The guide 48 has a U-shaped cross section taken perpendicular to a line extending between the front 52 and back 50 ends of the guide 48. Finally, the guide 48 may be comprised of a rigid and translucent material.

The guide 48 has stop hole 60 extending through a top surface 62 and a bottom surface 64 of the guide 48. Moreover, the stop hole 60 is positioned proximate the back end 50 of the guide 48. The guide 48 is coupled to the top side 26 of the front portion 18 of the housing 12. Continuing, the guide 48 extends between the rear portion 16 of the housing 12 and the front side 44 of the front portion 18 of the housing 12. The guide 48 has a width that is greater than a width of the tape 28.

A plurality of pin holes 66 extends through the top surface 62 and the bottom surface 64 of the guide 48. A first pair of the plurality of pin holes 68 is spaced laterally apart and positioned proximate the back end 50 of the guide 48. Additionally, a second pair of the pin holes 70 is spaced laterally apart and positioned proximate the front end 52 of the guide 48.

The guide 48 is one of a plurality of the guides 48. A bottom one of the plurality guides 72 is positioned beneath the tape 28 so an upper surface 74 of the bottom guide 72 engages the lower surface 76 of the tape 28. Additionally, a medial one of the plurality of guides 78 is positioned above the tape 28 so a lowermost surface 80 of the medial guide 78 engages the top surface 82 of the tape. A top one of the plurality of guides 84 is positioned above the medial guide 78 such that a bottommost surface 86 of the top guide 84 engages an uppermost surface 88 of the medial guide 78. Finally, the top guide 84 has a length that is less than each of the medial 78 and bottom 72 guides.

The medial guide 78 has a first brake aperture 90 extending through the lowermost 80 and the uppermost 88 surfaces of the medial guide 78. Additionally, the top guide 84 has a second brake aperture 92 extending through a topmost 91 and the bottommost 86 surfaces of the top guide 84. The top 84, medial 78 and bottom 72 guides are positioned so the stop hole 60 in each of the bottom 72, medial 78 and top 84 guides is aligned with each other and each of the first 90 and second 92 brake apertures is aligned with each other.

The first 90 and second 92 brake apertures each has an oval shape. A brake 94 is provided. The brake 94 is coupled to the top guide 84 so the brake 94 is positioned within the second brake aperture 92. The user 46 depresses the brake 94 so the brake 94 frictionally engages the top surface 92 of the tape 28. Additionally, the brake 94 may be comprised of a resiliently compressible material such as rubber or other similar material.

A plurality of pins 96 is provided. Each of the plurality of pins 96 extends through an associated one of the plurality of pin holes 66 in each of the top 84, medial 78 and bottom 72 guides. The plurality of pins 96 engages the front portion 18 of the housing 12. Each of the plurality of pins 96 retains the top 84, medial 78 and bottom 72 guides on the housing 12.

A stop 98 is provided. The stop 98 comprises a body 11 that has a lower edge 13 curving between each of a first end 15 and a second end 17 of a top edge 19 of the body 11. The body 11 has a quonset shape. Additionally, the body 11 has a rod aperture 21 extending through the top 19 and lower 13 edges of the body 11.

A rod 23 extends downwardly through the rod aperture 21. Additionally, a tip 25 is coupled to a bottom end 27 of the rod 23. The tip 25 may be comprised of a friction resistant material such as Teflon or other similar material. The rod 23 is positioned so a top end 29 of the rod 23 is flush with the top edge 19 of the body 11. The bottom end 27 of the rod 23 extends downwardly beyond the lower edge 13 of the body 11.

A U-shaped biasing member 31 is provided. A first end 33 of the U-shaped biasing member 31 is inserted into a biasing groove 35 extending forwardly into a back side 37 of the lower edge 13 of the body 11. Additionally, a second end 39 of the U-shaped biasing member 31 is coupled to the top guide 84. The U-shaped biasing member 31 biases the body 11 upwardly from the top guide 84. Finally, the rod 23 extends through each of the first 33 and second 39 ends of the U-shaped biasing 31 member so the U-shaped biasing member 31 is retained on the body 11.

The stop 98 is depressed downwardly by the user 46 so the bottom end 27 of the rod 23 extends downwardly through the stop hole 60 in each of the top 84, medial 78 and bottom 72 guides. As the retainer 38 is moved away from the front side 44 of the front portion 18 of the housing 12 and the tape 28 is distributed outwardly from the housing 12, the rod 23 engages a selected one of the plurality of tape holes 32 in the tape 28. Additionally, the rod 23 retains the retainer 38 on the tape 28 at a selected distance from the front side 44 of the front portion 18 of the housing 12.

A fastener 41 extends laterally through a first lateral side 43 of the body 11. The fastener 41 engages the rod 23 so the rod 23 is retained in the body 11. Lastly, the fastener 41 may be a screw of any conventional design.

A U-shaped clip 45 is provided. The U-shaped clip 45 is positioned within the second brake aperture 92. Additionally, the U-shaped clip 45 slidably engages the top guide 84 and the second end 39 of the U-shaped biasing member 31. The second end 39 of the U-shaped biasing member 31 is compressed between the U-shaped clip 45 and the top guide 84. Finally, the U-shaped clip 45 retains the U-shaped biasing member 31 on the top guide 84.

A jig 47 is elongated between a first oblique end 49 and a second oblique end 51 of the jig 47. The jig 47 comprises a pair of lateral arms 53 of the jig 47 coupled to and extending between an associated one of a first end 55 and a second end 57 of each of a pair of longitudinal arms 59 of the jig 47. The jig 47 is slidably coupled to the front side 44 of the front portion 14 of the housing 12. Moreover, the jig 47 is oriented perpendicular to the front side 44 of the front portion 14 of the housing 12.

A jig slot 61 extends into the front side 44 of the front portion 14 of the housing 12. The jig slot 61 extends between each of a first lateral side 63 and a second lateral side 65 of the front portion 44 of the housing 12. The jig slot 61 is positioned proximate the top side 26 of the front portion 44 of the housing 12. Finally, the jig 47 is slidably positioned within the jig slot 64.

A shaft 67 extends through the housing 12. A rear end 69 of the shaft 67 is exposed on a rear side 71 of the rear portion 16 of the housing 12. A front end 73 of the shaft 67 is exposed on the front side 44 of the front portion 14 of the housing 12. The rear end 69 of the shaft 67 is threaded.

A knob 75 threadably engages the rear end 69 of the shaft 67. A spring biasing member 77 is positioned around the shaft 67. Additionally, a retention pin 79 extends laterally through the shaft 67 proximate the front end 73 of the shaft 67. The spring biasing member 77 engages the knob 75 and the retention pin 79. Finally, the spring biasing member 77 biases the shaft 67 forwardly through the housing 12.

A tab 81 is coupled to the front end 73 of the shaft 67. The tab 81 engages a first one of the pair of lateral arms 83 of the jig 47. The user 46 tightens the knob 75 on the shaft 67 so the tab 81 is tightened against the first lateral arm 83 of the jig 47. Additionally, the tab 81 retains the jig 47 in a selected position with respect to the front portion 44 of the housing 12.

In use, the member 14 may be one of a plurality of members 14 each laid side by side. The housing 12 is positionable on a selected one of the plurality of members 14 so the retainer 38 on the tape 28 engages an end of the selected plurality of members 14. The knob 75 is loosened so the jig 47 is movable in the housing 12. Continuing, the jig 47 is moved so the jig 47 extends over each of the plurality of members 14. The knob 75 is tightened so the jig 47 is retained in the selected position.

The housing 12 is slid along the member 14 so the tape 28 is extended along the member 14. Continuing, the stop 98 is depressed until the rod 23 engages a selected one of the plurality of tape holes 32. The user 46 marks the plurality of members 14 along a second one of the pair of lateral arms 85 of the jig 47. Additionally, the user 46 marks the plurality of members 14 between each of the first 83 and second 85 lateral arms of the jig 47.

The marks on the plurality of members 14 indicates a location of framing studs to be positioned on the plurality of members 14. The stop 98 is released after the plurality of members 14 is marked. The user 46 pulls the housing 12 along the selected member 14 and depresses the stop 98 until the rod 23 engages the next tape hole 32. Additionally, the assembly 10 allows the user 46 to quickly and accurately mark a framing layout on the plurality of members 14 at 16 inch increments. The user 46 continues to mark the plurality of members 14 until the framing layout is indicated on the entire length of the plurality of members 14.

With respect to the above description, it is to be realized that the optimum dimensional relationship for the various components of the framing layout assembly 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the framing layout assembly 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A framing layout assembly for quickly determining and marking the framing layout on a member, said assembly comprising:
a housing being positionable proximate the member;
a tape operationally coupled to said housing such that said tape is configured to be extendable from said housing, said tape having indicia printed thereon such that said indicia indicates distance, said tape having a tape hole extending therethrough;
a guide operationally coupled to said housing such that said tape extends through said guide;
a stop operationally coupled to said housing, said stop being extendable through said hole in said tape such that said tape is retained at a pre-determined distance;
a jig operationally coupled to said housing, said jig being positionable on the member such that a user marks the member at the pre-determined distance;
said guide being elongated between a back end and a front end of said guide;
said guide curving upwardly from a middle of said guide toward each of a first lateral edge and a second lateral edge of said guide such that said guide has a U-shaped cross section taken perpendicular to a line extending between said first and second ends of said guide.

2. The assembly according to claim 1, wherein:
a rear portion of said housing having a height being similar to a length of said rear portion of said housing such that said rear portion of said housing has a square shape;
a front portion of said housing extending forwardly from a front side of said rear portion of said housing such that a bottom side of said rear portion of said housing is planar with a lower side of said front portion of said housing, a top side of said front portion of said housing being open; and
said front portion of said housing having a length being greater than a height of said front portion of said housing such that said front portion of said housing has a rectangular parallelepiped shape.

3. The assembly according to claim 1, wherein:
said tape being elongated, said tape being rolled upon itself said that said tape forms a spool; and
said spool of tape being rotatably coupled to said housing such that said spool of tape is positioned within an interior of a rear portion of said housing.

4. The assembly according to claim 1, wherein said tape hole being one of a plurality of tape holes being evenly spaced apart and distributed along an entire length of said tape.

5. The assembly according to claim 1, wherein:
a retainer coupled to a front end of said tape, said tape extending forwardly through a front portion of said housing such that said retainer abuts an outer surface of a front side of said front portion of said housing;
said retainer on said tape being extendable forwardly from said front side of said front portion of said housing such that said tape extends outwardly from said front portion of said housing such that said indicia on said tape is visible to the user.

6. The assembly according to claim 1, wherein:
said guide having stop hole extending through a top surface and a bottom surface of said guide such that said stop hole is positioned proximate said back end of said guide; and
said guide being coupled to a top side of a front portion of said housing such that said guide extends between a rear portion of said housing and a front side of said front portion of said housing.

7. The assembly according to claim 1, wherein:
said guide being one of a plurality of said guides;
a bottom one of said plurality guides being positioned beneath said tape such that an upper surface of said bottom guide engages a lower surface of said tape;
a medial one of said plurality of guides being positioned above said tape such that a lowermost surface of said medial guide engages a top surface of said tape; and
a top one of said plurality of guides being positioned above said medial guide wherein a bottommost surface of said top guide engages said uppermost surface of said medial guide.

8. The assembly according to claim 7, wherein:
said medial guide having a first brake aperture extending through said lowermost and an uppermost surface of said medial guide;
said top guide having a second brake aperture extending through a topmost and said bottommost surface of said top guide; and
said top, medial and bottom guides being positioned such that a stop hole in each of said bottom, medial and top guides is aligned with each other and each of said first and second brake apertures is aligned with each other.

9. The assembly according to claim 1, wherein said stop further comprising:
a body having a lower edge curving between each of a first end and a second end of a top edge of said body such that said body have a quonset shape;
said body having a rod aperture extending through said top and lower edges of said body;
a rod extending downwardly through said rod aperture; and
a U-shaped biasing member, a first end of said U-shaped biasing member being inserted into a biasing groove extending forwardly into a back side of said lower edge of said body, a second end of said U-shaped biasing member being coupled to a top guide such that said body is supported above said top guide.

10. The assembly according to claim 1, wherein said stop being depressed downwardly by the user such that a bottom end of a rod extends downwardly through a stop hole in each of a top, medial and bottom guide and engaging a selected one of a plurality of tape holes in said tape, said rod retaining a retainer on said tape at a selected distance from a front end of a front portion of said housing.

11. The assembly according to claim 1, wherein:
said jig being elongated between a first oblique end and a second oblique end of said jig; and
said jig comprising a pair of lateral arms of said jig coupled to and extending between an associated one of a first end and a second end of each of a pair of longitudinal arms of said jig.

12. The assembly according to claim 1, wherein said jig being slidably coupled to a front side of a front portion of said housing such that said jig is oriented perpendicular to said front side of said front portion of said housing.

13. The assembly according to claim 1, wherein:
a shaft extending through said housing such that a rear end of said shaft is exposed on a rear side of a rear portion of said housing and a front end of said shaft is exposed on a front side of a front portion of said housing;
a tab coupled to said front end of said shaft such that said tab engages a first one of a pair of lateral arms of said jig; and
said tab retaining said jig in a selected position with respect to said front portion of said housing.

14. The assembly according to claim 1, wherein:
said housing being positionable on the member such that said retainer on said tape engages the member;
said housing being slid along the member such that said tape is extended along the member;
said stop being depressed until a rod engages a selected one of a plurality of tape holes; and
the user marks the member along a lateral arm of said jig.

15. A framing layout assembly for quickly determining and marking the framing layout on a member, said assembly comprising:
a housing being positionable proximate the member;
a tape operationally coupled to said housing such that said tape is configured to be extendable from said housing, said tape having indicia printed thereon such that said indicia indicates distance, said tape having a tape hole extending therethrough;
a guide operationally coupled to said housing such that said tape extends through said guide;
a stop operationally coupled to said housing, said stop being extendable through said hole in said tape such that said tape is retained at a pre-determined distance;
a jig operationally coupled to said housing, said jig being positionable on the member such that a user marks the member at the pre-determined distance;
wherein a retainer coupled to a free end of said tape; said tape extending forwardly through a front portion of said housing such that said retainer abuts an outer surface of a front side of said front portion of said housing; said retainer on said tape being extendable forwardly from said front side of said front portion of said housing such that said tape extends outwardly from said front portion of said housing such that said indicia on said tape is visible to the user; said guide being elongated between a back end and a front end of said guide; said guide curving upwardly from a middle of said guide toward each of a first lateral edge and a second lateral edge of said guide such that said guide has a U-shaped cross section taken perpendicular to a line extending between said front and back ends of said guide; said guide having stop hole extending through a top surface and a bottom surface of said guide such that said stop hole is positioned proximate said back end of said guide; said guide being coupled to a top side of said front portion of said housing such that said guide extends between a rear portion of said housing and said front side of said front portion of said housing.

16. The assembly according to claim 15, wherein a rear portion of said housing having a height being similar to a length of said rear portion of said housing such that said rear portion of said housing has a square shape; a front portion of said housing extending forwardly from a front side of said rear portion of said housing such that a bottom side of said rear portion of said housing is planar with a lower side of said front portion of said housing; a top side of said front portion of said housing being open; said front portion of said housing having a length being greater than a height of said front portion of said housing such that said front portion of said housing has a rectangular parallelepiped shape; said tape being elongated; said tape being rolled upon itself said that said tape forms a spool; said spool of tape being rotatably coupled to said housing such that said spool of tape is positioned within an interior of a rear portion of said housing; said tape hole being one of a plurality of tape holes being evenly spaced apart and distributed along an entire length of said tape.

17. The assembly according to claim 15, wherein said guide being one of a plurality of said guides; a bottom one of said plurality guides being positioned beneath said tape such that an upper surface of said bottom guide engages a lower surface of said tape; a medial one of said plurality of guides being positioned above said tape such that a lowermost surface of said medial guide engages a top surface of said tape; a top one of said plurality of guides being positioned above said medial guide such that a bottommost surface of said top guide engages said uppermost surface of said medial guide; said medial guide having a first brake aperture extending through said lowermost and an uppermost surface of said medial guide; said top guide having a second brake aperture extending through a topmost and said bottommost surface of said top guide; said top, medial and bottom guides being positioned such that a stop hole in each of said bottom, medial and top guides is aligned with each other and each of said first and second brake apertures is aligned with each other; said stop further comprising a body having a lower edge curving between each of a first end and a second end of a top edge of said body such that said body have a quonset shape; said body having a rod aperture extending through said top and lower edges of said body; a rod extending downwardly through said rod aperture; a U-shaped biasing member; a first end of said U-shaped biasing member being inserted into a biasing groove extending forwardly into a back side of said lower edge of said body, a second end of said U-shaped biasing member being coupled to a top guide such that said body is supported above said top guide; said stop being depressed downwardly by the user such that a bottom end of a rod extends downwardly through a stop hole in each of a top, medial and bottom guide and engaging a selected one of a plurality of tape holes in said tape; said rod retaining a retainer on said tape at a selected distance from a front side of a front portion of said housing.

18. The assembly according to claim 15, wherein said jig being elongated between a first oblique end and a second oblique end of said jig; said jig comprising a pair of lateral arms of said jig coupled to and extending between an associated one of a first end and a second end of each of a pair of longitudinal arms of said jig; said jig being slidably coupled to a front side of a front portion of said housing such that said jig is oriented perpendicular to said front side of said front portion of said housing; a shaft extending through said housing such that a rear end of said shaft is exposed on a rear side of a rear portion of said housing and a front end of said shaft is exposed on a front side of a front portion of said housing; a tab coupled to said front end of said shaft such that said tab engages a first one of a pair of lateral arms of said jig; said tab retaining said jig in a selected position with respect to said front portion of said housing; said housing being positionable on the member such that said retainer on said tape engages the member; said housing being slid along the member wherein said tape is extended along the member; said stop being depressed until said rod engages a selected one of a plurality of tape holes wherein the user marks the member along a lateral arm of said jig.

\* \* \* \* \*